United States Patent
Yuan et al.

(10) Patent No.: US 9,647,976 B2
(45) Date of Patent: May 9, 2017

(54) METHOD AND DEVICE FOR IMPLEMENTING END-TO-END HARDWARE MESSAGE PASSING

(75) Inventors: Cissy Yuan, Shenzhen (CN); Zhigang Zhu, Shenzhen (CN); Jian Wang, Shenzhen (CN); Xuehong Tian, Shenzhen (CN); Daibing Zeng, Shenzhen (CN); Wanting Tian, Shenzhen (CN); Fang Qiu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 311 days.

(21) Appl. No.: 14/369,963

(22) PCT Filed: May 14, 2012

(86) PCT No.: PCT/CN2012/075465
§ 371 (c)(1),
(2), (4) Date: Jul. 25, 2014

(87) PCT Pub. No.: WO2013/097397
PCT Pub. Date: Jul. 4, 2013

(65) Prior Publication Data
US 2014/0372547 A1    Dec. 18, 2014

(30) Foreign Application Priority Data

Dec. 30, 2011  (CN) .......................... 2011 1 0455211

(51) Int. Cl.
*G06F 15/16*     (2006.01)
*G06F 15/173*    (2006.01)
(Continued)

(52) U.S. Cl.
CPC ............. *H04L 51/36* (2013.01); *G06F 13/382* (2013.01); *H04L 29/06* (2013.01); *H04L 69/16* (2013.01); *H04L 69/161* (2013.01)

(58) Field of Classification Search
CPC ........ H04L 69/16; H04L 69/161; H04L 29/06
(Continued)

(56) References Cited

U.S. PATENT DOCUMENTS

| | | | |
|---|---|---|---|
| 5,319,753 A | 6/1994 | MacKenna | |
| 5,528,761 A * | 6/1996 | Ooba | ..................... G06F 13/36 709/206 |

(Continued)

FOREIGN PATENT DOCUMENTS

| | | |
|---|---|---|
| CN | 101442503 A | 5/2009 |
| CN | 102013981 A | 4/2011 |

(Continued)

OTHER PUBLICATIONS

International Search Report in international application No. PCT/CN2012/075465, mailed on Oct. 18, 2012.
(Continued)

*Primary Examiner* — Hieu Hoang
(74) *Attorney, Agent, or Firm* — Oppedahl Patent Law Firm LLC

(57) ABSTRACT

A method and device for implementing end-to-end Hardware Message Passing (HMP) are disclosed. The device includes: a message memory, a controller, a message input interface and a message output interface. The message memory is configured to temporarily store a message. The controller is configured to perform management on a message in the form of hardware, store a message obtained from the message input interface into the message memory, and read a message from the message memory and transmit the message to a message user via the message output interface.
(Continued)

The message input interface is directly connected with a message creator and is configured to obtain a message created by the message creator under the control of the controller. The message output interface is directly connected to the message and is configured to provide a message to the message user under the control of the controller. The disclosure can improve the efficiency of message passing and reduce software management overhead.

6 Claims, 4 Drawing Sheets

(51) Int. Cl.
  *H04L 12/58* (2006.01)
  *G06F 13/38* (2006.01)
  *H04L 29/06* (2006.01)
(58) Field of Classification Search
  USPC .................................. 709/250, 230, 238
  See application file for complete search history.

(56) References Cited

U.S. PATENT DOCUMENTS

| | | | |
|---|---|---|---|
| 5,815,166 A * | 9/1998 | Baldwin | G06T 1/20 345/506 |
| 5,948,060 A * | 9/1999 | Gregg | H04L 49/90 709/200 |
| 6,052,754 A * | 4/2000 | Anand | G06F 13/362 710/305 |
| 6,336,145 B2 * | 1/2002 | Kim | G06F 13/1657 709/237 |
| 6,425,021 B1 * | 7/2002 | Ghodrat | G06F 13/385 710/20 |
| 6,587,961 B1 * | 7/2003 | Garnett | G06F 11/004 714/11 |
| 7,584,319 B1 | 9/2009 | Liao | |
| 8,095,722 B1 | 1/2012 | Liao | |
| 2002/0052914 A1 * | 5/2002 | Zalewski | G06F 9/5077 709/203 |
| 2003/0061395 A1 * | 3/2003 | Kingsbury | G06F 9/544 719/312 |
| 2004/0024946 A1 * | 2/2004 | Naumann | G06F 15/78 710/309 |
| 2004/0117534 A1 * | 6/2004 | Parry | G06F 13/24 710/260 |
| 2007/0121822 A1 | 5/2007 | Carnale et al. | |
| 2008/0244231 A1 * | 10/2008 | Kunze | G06F 9/3828 712/207 |
| 2009/0132672 A1 | 5/2009 | Holdsworth | |
| 2010/0030918 A1 | 2/2010 | Casper | |
| 2010/0185719 A1 * | 7/2010 | Howard | G06F 8/45 709/201 |
| 2010/0205378 A1 * | 8/2010 | Moyer | G06F 12/1027 711/146 |
| 2010/0325388 A1 * | 12/2010 | Howard | G06F 15/17375 712/29 |
| 2011/0047310 A1 * | 2/2011 | Bonola | G06F 9/4812 710/268 |
| 2011/0153691 A1 * | 6/2011 | Allen | G06F 12/0253 707/816 |
| 2012/0278814 A1 * | 11/2012 | Shivalingappa | G06F 9/544 719/312 |

FOREIGN PATENT DOCUMENTS

| | | |
|---|---|---|
| CN | 102063406 A | 5/2011 |
| CN | 102112974 A | 6/2011 |

OTHER PUBLICATIONS

English Translation of the Written Opinion of the International Search Authority in international application No. PCT/CN2012/075465, mailed on Oct. 18, 2012.

Supplementary European Search Report in European application No. 12862413.7, mailed on Jun. 2, 2015.

* cited by examiner

METHOD AND DEVICE FOR IMPLEMENTING END-TO-END HARDWARE MESSAGE PASSING

TECHNICAL FIELD

The disclosure relates to the field of message passing technology, and in particular to a method and device for implementing end-to-end Hardware Message Passing (HMP).

BACKGROUND

As technology develops, a system becomes more complex, the number of integrated core is also increasing, and inter-core communication is increasingly important as well. Traditional inter-core communication is usually implemented by hardware, i.e., a shared memory. As shown in FIG. 1, multiple cores are connected with a shared memory via an interconnection system. The advantage of this implementation is that the cross-transmission of information can be implemented between a plurality of cores, and its disadvantages include as follows:

1. The message passing delay is longer, because a message to be transmitted needs to be written to a shared memory first by a message creator and then the message is read by a message user from the shared memory, which require to be implemented through a system interconnection network, thereby resulting in a longer path delay, but also will compete and judge with other data accesses in order to obtain the right to use a bus; and 2. Software is required for message management, because the shared memory can only be used to store a message temporarily, the message needs to be interrupted and be notified to the message user after the message has been written to the shared memory by the message creator and the message user can be notified, and the message creator and the message user need to share, manage and maintain a message queue pointer, to avoid issues such as message coverage and message reuse.

In many practical applications, the message user is determined, the frequency and time of usage of the message are also determined. For this situation, some existing solutions use a directly connected interface for message passing, in order to improve the efficiency of message passing and reduce a passing delay, as shown in FIG. 2 and FIG. 3. FIG. 2 illustrates message passing between extendible cores via a directly connected interface, and FIG. 3 illustrates First Input First Output (FIFO) message passing based on FIG. 2. This message passing implemented by using a directly connected interface has the following defects: first, a processor must be extendible and may be expanded with a message transmitting port or a message receiving port; and second, in this approach, software is still required for message management, and software management overhead is not reduced whereas only the delay of message passing is reduced.

SUMMARY

In view of this, the disclosure provides a method and device for implementing end-to-end hardware message passing, so as to improve the efficiency of message passing and reduce software management overhead.

To this end, a technical solution of the disclosure is implemented as follows.

The disclosure provides a device for implementing end-to-end hardware message passing, which includes: a message memory, a controller, a message input interface and a message output interface, wherein the message memory is configured to temporarily store a message;

the controller is configured to perform management on a message in the form of hardware, store a message obtained from the message input interface into the message memory, and read a message from the message memory and transmit the message to a message user via the message output interface;

the message input interface is directly connected with a message creator and is configured to obtain a message created by the message creator under the control of the controller; and the message output interface is directly connected with the message user and is configured to provide a message to the message user under the control of the controller.

The message input interface may be a master interface or a slave interface, when the message input interface is the master interface, the message input interface may actively obtain the message created by the message creator under the control of the controller, and when the message input interface is the slave interface, the message input interface may passively obtain the message created by the message creator under the control of the controller; and the message output interface may be a master interface or a slave interface, when the message output interface is the master interface, the message output interface may actively provide the message to the message user under the control of the controller; and when the message output interface is the slave interface, the message output interface may passively provide the message to the message user under the control of the controller.

When the message output interface is the master interface, the controller may be configured to:

obtain a status of the message creator via the message input interface, and extract a message from a buffer of the message creator based on the status; or extract messages from the buffer of the message creator via the message input interface periodically.

When the message input interface is the slave interface, the controller may be configured to:

receive the message transmitted actively by the message creator via the message input interface.

When the message output interface is the master interface, the controller may be configured to:

obtain a status of the message user via the message output interface, read the message from the message memory based on the status, and transmit the message to the message user via the message output interface; or read messages from the message memory periodically, and transmit the messages to the message user via the message output interface.

When the message output interface is the slave interface, the controller may be configured to:

provide a message queue status to the message user via the message output interface, obtain a read request transmitted by the message user based on the message queue status via the message output interface, read the message from the message memory based on the read request, and transmit the message to the message user via the message output interface; or obtain the read request transmitted periodically by the message user via the message output interface, read the message from the message memory based on the read request, and transmit the message to the message user via the message output interface.

The disclosure also provides a method for implementing end-to-end hardware message passing. The method includes that:

a controller obtains a message created by a message creator directly connected with a message input interface via the message input interface, stores the obtained message into a message memory temporarily, and performs management of the message stored into the message memory in hardware; and the controller reads a message, from the message memory, and transmits the read message to the message user directly connected with a message output interface via the message output interface.

The message input interface may be a master interface or a slave interface, when the message input interface is the master interface, the message input interface may actively obtain the message created by the message creator under the control of the controller; and when the message input interface is the slave interface, the message input interface may passively obtain the message created by the message creator under the control of the controller;

the message output interface may be a master interface or a slave interface, when the message output interface is the master interface, the message output interface may actively provide the message to the message user under the control of the controller; and when the message output interface is the slave interface, the message output interface may passively provide the message to the message user under the control of the controller.

The step that the message input interface actively obtains the message created by the message creator under the control of the controller may include that:

the controller obtains a status of the message creator via the message input interface, and extracts a message from a buffer of the message creator based on the status; or the controller extracts messages from the buffer of the message creator via the message input interface periodically.

The step that the message input interface passively obtains the message created by the message creator under the control of the controller may include that:

the controller receives the message transmitted b actively y the message creator via the message input interface.

The step that the message output interface actively transmits the read message to the message user under the control of the controller may include that:

the controller obtains a status of the message user via the message output interface, reads the message from the message memory based on the status, and transmits the message to the message user via the message output interface; or the controller reads messages from the message memory periodically, and transmits the messages to the message user via the message output interface.

The step that the message output interface passively transmits the read message to the message user under the control of the controller may include that:

the controller provides a message queue status to the message user via the message output interface, obtains a read request transmitted by the message user based on the message queue status via the message output interface, reads the message from the message memory based on the read request, and transmits the message to the message user via the message output interface; or the controller obtains the read request transmitted periodically by the message user via the message output interface, reads the message from the message memory based on the read request, and transmits the message to the message user via the message output interface.

In the method and device for implementing end-to-end HMP provided by the disclosure, an HMP hardware device is directly connect with a message creator and a message user, so that the end-to-end HMP message passing is no longer via a complex interconnection system, compared to the existing shared memory solution, the delay of a data access path can be shortened, and the delay of competition and judgment and waiting delay due to judgment failure in the complex interconnect system are omitted. The message management of the disclosure is completed by a hardware controller, compared with the existing solutions, software buffering management overhead of a message is omitted. Accordingly, the disclosure can improve the efficiency of message passing and reduce software management overhead.

DETAILED DESCRIPTION

The technical solution of the disclosure is elaborated detail below in combination with the drawings and specific embodiments.

Figure 1:
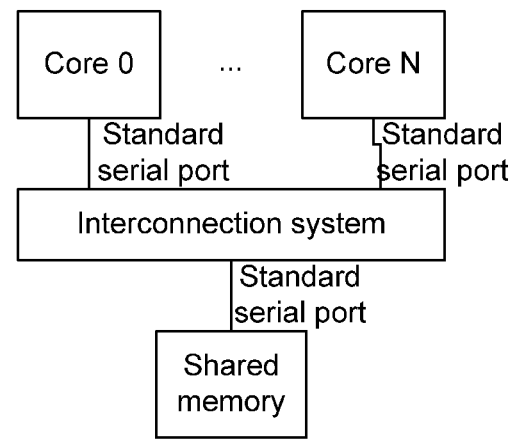
FIG. 1 is a schematic diagram of hardware implementation of message passing by using a shared memory in existing technologies.
Figure 2:
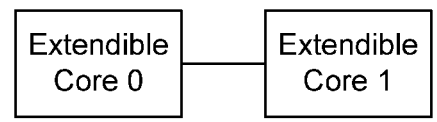
FIG. 2 is a first schematic diagram of hardware implementation of message passing via a direct interface in existing technologies.
Figure 3:
FIG. 3 is a second schematic diagram of hardware implementation of message passing via a direct interface in existing technologies.
Figure 4:
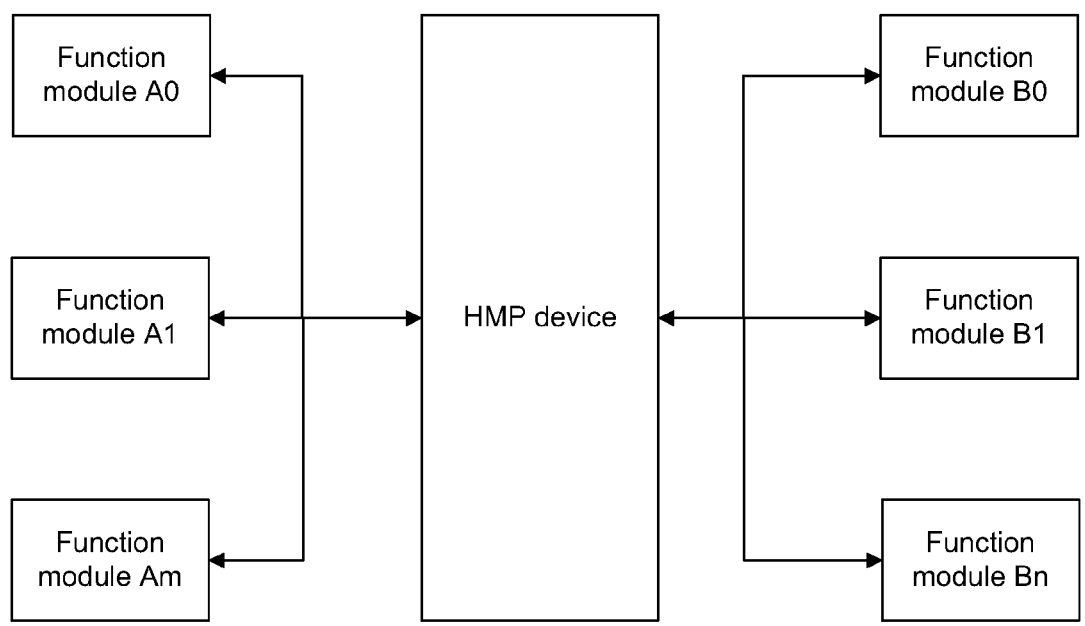
FIG. 4 is a schematic diagram of hardware implementation of HMP in an embodiment of the disclosure.

FIG. 4 shows a schematic diagram of a hardware implementation of HMP provided by an embodiment of the disclosure. An HMP device is connected with various function modules externally to implement message passing between different function modules. Here, the function module may be a core, and may also be a hardware accelerator, a chip or the like. That is, the disclosure is not only applicable to message passing of a function module in a chip, but also to message passing of function modules between chips.

Figure 5:
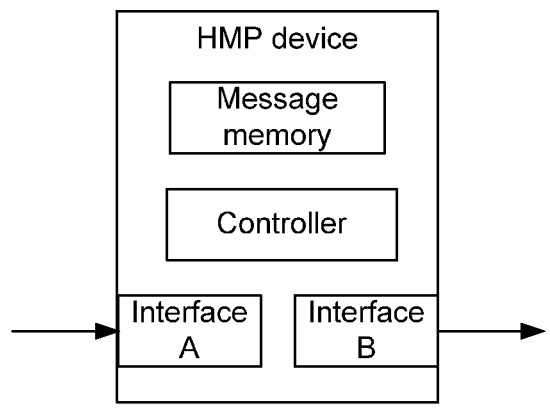
FIG. 5 is a schematic diagram of a structure of a HMP device in an embodiment of the disclosure.

A structure of an HMP device for implementing message passing between different function modules is shown in FIG. 5. The HMP device mainly includes a message memory, a controller, a message input interface and a message output interface. The message memory is configured to temporarily store a message. The controller is configured to perform management on a message in the form of hardware, store a message obtained from the message input interface into the message memory, and read a message from the message memory and transmit the message to a message user via the message output interface. The message input interface (corresponding to an interface A shown in FIG. 5), is directly connected to a message creator, and is configured to actively or passively obtain a message created by the message creator under the control of the controller. The message output interface (corresponding to an interface B shown in FIG. 5), is directly connected to the message user, and is configured to actively or passively provide a message to the message user under the control of the controller.

Preferably, the message input interface and the message output interface may be made into a master interface or a slave interface as required. The master interface mainly implements a Direct Memory Access (DMA) function. When a message creator cannot transmit a message voluntarily, the message input interface is implemented as a master interface. When the message creator can transmit a message voluntarily, the message input interface is implemented as a slave interface. When a message receiver cannot obtain a message voluntarily, the message output interface is implemented as a master interface. When a message receiver can obtain a message voluntarily, the message output interface is implemented as a slave interface. There is no restriction on protocols of an interface, which may be a standard or customized interface depending on actual needs.

In other words, the message input interface may be a master interface or a slave interface, when the message input interface is the master interface, the message input interface actively obtains the message created by the message creator under the control of the controller, and when the message input interface is the slave interface, the message input interface passively obtains the message created by the message creator under the control of the controller; and the message output interface may also be a master interface or a slave interface, when the message output interface is the master interface, the message output interface actively provides the message to the message user under the control of the controller, and when the message output interface is the slave interface, the message output interface passively provides the message to the message user under the control of the controller.

The end-to-end HMP method implemented by the HMP device mainly includes that: a controller obtains a message created by a message creator directly connected with a message input interface via the message input interface, temporarily stores the obtained message into the message memory, and performs management of the message stored into the message memory in hardware; and the controller reads a message from the message memory, and transmits the read message to the message user directly connected with a message output interface via the message output interface.

The message input interface may be a master interface or a slave interface, when the message input interface is the master interface, the message input interface actively obtains the message created by the message creator under the control of the controller, and when the message input interface is the slave interface, the message input interface passively obtains the message created by the message creator under the control of the controller; and the message output interface may also be a master interface or a slave interface, when the message output interface is the master interface, the message output interface actively provides the message to the message user under the control of the controller, and when the message output interface is the slave interface, the message output interface passively provides the message to the message user under the control of the controller.

The operation that the message input interface actively obtains the message created by the message creator under the control of the controller includes that:

the controller obtains a status of the message creator via the message input interface, and extracts a message from a buffer of the message creator based on the status; or the controller extracts messages from the buffer of the message creator via the message input interface periodically.

The operation that the message input interface passively obtains the message created by the message creator under the control of the controller includes that: the controller receives the message transmitted actively by the message creator via the message input interface.

The operation that the message output interface actively transmits the read message to the message user under the control of the controller includes that:

the controller obtains a status of the message user via the message output interface, reads the message from the message memory based on the status and transmits the message to the message user via the message output interface; or the controller reads messages from the message memory periodically, and transmits the messages to the message user via the message output interface.

The operation that the message output interface passively transmits the read message to the message user under the control of the controller includes that:

the controller provides a message queue status to the message user via the message output interface, obtains a read request transmitted by the message user based on the message queue status via the message output interface, reads the message from the message memory based on the read request and transmits the message to the message user via the message output interface; or the controller obtains the read request transmitted periodically by the message user via the message output interface, reads the message from the message memory based on the read request, and transmits the message to the message user via the message output interface.

The end-to-end HMP method and system of the disclosure is further elaborated with reference to the structure of an HMP device shown in FIG. 5 and in combination with specific embodiments.

The embodiments may be combined as required, and several common one-to-one application implementations are given subsequently, as shown in FIGS. 6 to 9. The direction indicated by the arrow denotes the flow direction of a message, a function module 0 represents a message creator, a function module 1 represents a message user, "m" indicates a data interface behaves as a master, "s" indicates a data interface behaves as a slave, the master is a message passing originator, and the slave is a message passing receiver or responder. Furthermore, in an embodiment of the disclosure, the message creator and the message user may be various function modules, such as a core, a hardware accelerator and a chip.

Figure 6:
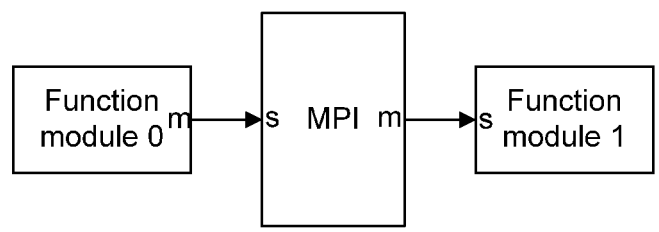
FIG. 6 is a schematic diagram of end-to-end HMP in a one-to-one slave-master manner described in a first embodiment of the disclosure.

As shown in FIG. 6, a first embodiment of the disclosure describes end-to-end HMP in a one-to-one slave-master mode. A message input interface of an HMP device is implemented with a slave interface (for example, an s interface in a Message Passing Interface MPI module shown in FIG. 6 is a message input interface), and a message output interface of the HMP device is implemented with a master interface (for example, an m interface in the MPI module shown in FIG. 6 is a message output interface). The message passing process of the HMP device mainly includes the following steps:

Step 601: A message creator (a function module 0) directly transmits a created message to the message input interface, i.e., an interface A (i.e., the m interface in the MPI module shown in FIG. 6), of the HMP device.

In this embodiment, the message creator is a message passing originator, which directly transmits the created message to the message input interface of the HMP device actively.

Step 602: The interface A transmits the received message to a controller of the HMP device.

Step 603: The controller of the HMP device stores the message into a buffer or memory, i.e., message memory of the HMP device, while maintaining a write pointer.

Step 604: The controller of the HMP device obtains a reception status of a message user (a function module 1) via an interface B, determines, based on the reception status of the message user or a timer, when to extract the message from the buffer or memory, and transmits the message to the interface B (i.e., the m interface in the MPI module shown in FIG. 6) while maintaining a read pointer.

Step 605: The message output interface, i.e., the interface B, of the HMP device transmits the message to the message user based on an interface protocol.

Figure 7:
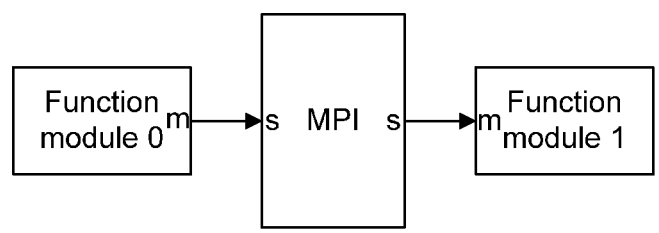
FIG. 7 is a schematic diagram of end-to-end HMP in a one-to-one slave-slave manner described in a second embodiment of the disclosure.

As shown in FIG. 7, a first embodiment of the disclosure describes end-to-end HMP in a one-to-one slave-slave mode. A message input interface of an HMP device is implemented with a slave interface (for example, a left s interface in an MPI shown in FIG. 7 is a message input interface), and a message output interface of the HMP device is also implemented with a slave interface (for example, a right s interface in the MPI shown in FIG. 7 is a message output interface). The message passing process of the HMP device mainly includes the following steps:

Step 701: A message creator (a function module 0) directly transmits a created message to a message input interface, i.e., an interface A of the HMP device (i.e., the left m interface in the MPI module shown in FIG. 7).

In this embodiment, the message creator is a message passing originator, which directly transmits the created message to the message input interface of the HMP device actively.

Step 702: The interface A transmits the received message to a controller of the HMP device.

Step 703: The controller of the HMP device stores the message into a buffer or memory of the HMP device, while maintaining a write pointer.

Step 704: A message user (a function module 1) obtains a message queue status via an interface B (i.e., a right s interface in the MPI module shown in FIG. 7), and determines, based on the message queue status or a timer, when to obtain the message.

Step 705: The message user reads the message via the message output interface, i.e., the interface B, of the HMP device.

Step 706: The interface B of the HMP device transmits a read request to the controller.

Step 707: The controller of the HMP device reads the message from the buffer or memory and transmits the message to the interface B, while maintaining the read pointer in the buffer of the HMP device.

Step 708: The interface B of the HMP device returns the message provided by the controller to the message user.

Figure 8:
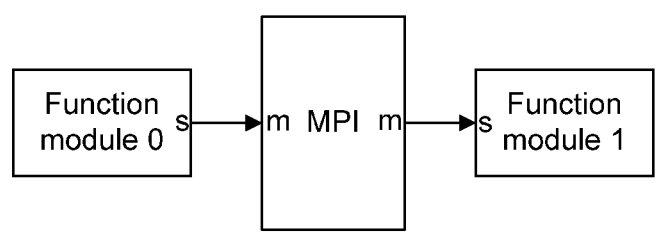
FIG. 8 is a schematic diagram of end-to-end HMP in a one-to-one master-master manner described in a third embodiment of the disclosure.

As shown in FIG. 8, a first embodiment of the disclosure describes end-to-end HMP in a one-to-one master-master mode. A message input interface of an HMP device is implemented with a master interface (for example, a left m interface m in an MPI module shown in FIG. 8 is a message input interface), and a message output interface of the HMP device is also implemented with a master interface (for example, a right m interface in the MPI module shown in FIG. 8 is a message output interface). The message passing process of the HMP device mainly includes the following steps:

Step 801: A message creator (a function module 0) stores a created message into a buffer thereof.

Step 802: The HMP device obtains a status of the message creator via the interface A (i.e., the left m interface in the MPI module shown in FIG. 8), determines, based on the status of the message creator or a timer, when to extract the message from the message creator, and transmits the extracted message to the controller of the HMP device.

Step 803: The controller of the HMP device stores the message into the buffer or memory of the HMP device, while maintaining a write pointer.

Step 804: The controller of the HMP device obtains a reception status of a message user (a function module 1) via an interface B, determines, based on the reception status of the message user or the timer, when to extract the message from the buffer or memory, and transmits the message to the interface B (i.e., the right m interface in the MPI module shown in FIG. 8), while maintaining a read pointer.

Step 805: The message output interface, i.e., the interface B, of the HMP device transmits the message to the message user based on an interface protocol.

Figure 9:
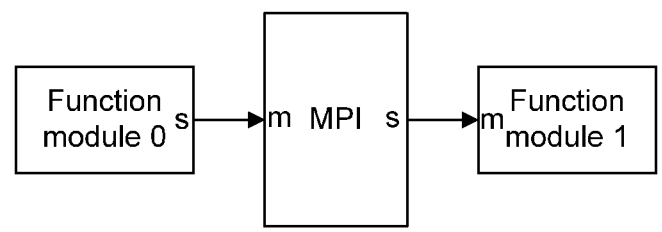
FIG. 9 is a schematic diagram of end-to-end HMP in a one-to-one master-slave manner described in a fourth embodiment of the disclosure.

As shown in FIG. 9, a first embodiment of the disclosure describes end-to-end HMP in a one-to-one master-slave mode. A message input interface of an HMP device is implemented with a master interface (for example, an m interface in an MPI module shown in FIG. 9 is a message input interface), and a message output interface of the HMP device is implemented with a slave interface (for example, an s interface in the MPI module shown in FIG. 9 is a message output interface). The message passing process of the HMP device mainly includes the following steps:

Step 901: A message creator (a function module 0) stores the created message in a buffer thereof.

Step 902: The HMP device obtains a status of a message creator via an interface A (i.e., the m interface in the MPI module shown in FIG. 9), determines, based on the status of the message creator or a timer, when to extract the message from the message creator, and transmits the extracted message to a controller of the HMP device.

Step 903: The controller of the HMP device stores the message in a buffer or memory of the HMP device, while maintaining a write pointer.

Step 904: A message user (a function module 1) obtains a message queue status via an interface B (i.e., the s interface in the MPI module shown in FIG. 9), and determines, based on the message queue status or a timer, when to obtain the message.

Step 905: The message user reads the message via a message output interface, i.e., the interface B, of the HMP device.

Step 906: The interface B of the HMP device transmits a read request to the controller.

Step 907: The controller of the HMP device reads the message from the buffer or memory and transmits the message to the interface B, while maintaining a read pointer in the buffer of the HMP device.

Step 908: The interface B of the HMP device returns the message to the message user.

The above are only the preferred embodiments of the disclosure, but are not intended to limit the scope of protection of the claims of the disclosure.

The invention claimed is:

1. A device for implementing end-to-end Hardware Message Passing (HMP), comprising:
   a message memory, a controller, a message input interface and a message output interface, wherein:
   the message memory is configured to temporarily store a message;
   the controller is configured to perform management on the message in the form of hardware, store the message obtained from the message input interface into the message memory, and read the message from the message memory and transmit the message to a message using device via the message output interface;
   the message input interface is directly connected with a message creating device and is configured to obtain the message created by the message creating device under control of the controller; and
   the message output interface is directly connected with the message using device and is configured to provide the message to the message using device under the control of the controller;
   wherein there is no other device between the device for implementing end-to-end HMP and the message creating device or the message using device;
   wherein the message input interface is a master interface or a slave interface, when the message input interface is the master interface, the message input interface actively obtains the message created by the message creating device under the control of the controller, and when the message input interface is the slave interface, the message input interface passively obtains the message created by the message creating device under the control of the controller; and
   the message output interface is a master interface or a slave interface, when the message output interface is the master interface, the message output interface actively provides the message to the message using device under the control of the controller, and when the message output interface is the slave interface, the message output interface passively provides the message to the message using device under the control of the controller;
   wherein the message input interface actively obtains the message created by the message creating device comprises: when the message creating device cannot transmit the message voluntarily, the message input interface is implemented as the master interface, and actively obtains the message created by the message creating device;
   wherein the message input interface passively obtains the message created by the message creating device comprises: when the message creating device can transmit the message voluntarily, the message input interface is implemented as the slave interface, and receives the message sent by the message creating device actively;
   wherein the message output interface actively provides the message to the message using device comprises: when the message using device cannot obtain the message voluntarily, the message output interface is implemented as the master interface, and sends the message actively to the message using device;
   wherein the message output interface passively provides the message to the message using device comprises: when the message using device can obtain the message voluntarily, the message output interface is implemented as the slave interface, and sends the message to the message using device in response to a message request from the message using device;
   wherein when the message output interface is the master interface, the controller is configured to:
   obtain a status of the message using device via the message output interface, read the message from the message memory based on the status, and transmit the message to the message using device via the message output interface; or
   read messages from the message memory periodically, and transmit the messages to the message using device via the message output interface;
   wherein when the message output interface is the slave interface, the controller is configured to:
   provide a message queue status to the message using device via the message output interface, obtain a read request transmitted by the message using device based on the message queue status via the message output interface, read the message from the message memory based on the read request, and transmit the message to the message using device via the message output interface; or
   obtain the read request transmitted periodically by the message using device via the message output interface, read the message from the message memory based on the read request, and transmit the message to the message using device via the message output interface.

2. The device according to claim 1, wherein when the message output interface is the master interface, the controller is configured to:
   obtain a status of the message creating device via the message input interface, and extract the message from a buffer of the message creating device based on the status; or
   extract messages from the buffer of the message creating device via the message input interface periodically.

3. The device according to claim 1, wherein when the message input interface is the slave interface, the controller is configured to:
   receive the message transmitted actively by the message creating device via the message input interface.

4. A method for implementing end-to-end Hardware Message Passing (HMP), comprising:
   obtaining, by a controller, a message created by a message creating device directly connected with a message input interface via the message input interface, storing the obtained message into a message memory temporarily, and performing management of the message stored into the message memory in hardware; and
   reading the message from the message memory, and transmitting the read message to the message using device directly connected with a message output interface via the message output interface;
   wherein there is no other device between the message input interface and the message creating device or between the message output interface and the message using device;
   wherein the message input interface is a master interface or a slave interface, when the message input interface is the master interface, the message input interface actively obtains the message created by the message creating device under the control of the controller, and when the message input interface is the slave interface, the message input interface passively obtains the message created by the message creating device under the control of the controller; and the message output interface is a master interface or a slave interface, when the message output interface is the master interface, the message output interface actively provides the message to the message using device under the control of the controller, and when the message output interface is the slave interface, the message output interface passively provides the message to the message using device under the control of the controller;

wherein the message input interface actively obtains the message created by the message creating device comprises: when the message creating device cannot transmit the message voluntarily, the message input interface is implemented as the master interface, and actively obtains the message created by the message creating device;

wherein the message input interface passively obtains the message created by the message creating device comprises: when the message creating device can transmit the message voluntarily, the message input interface is implemented as the slave interface, and receives the message sent by the message creating device actively;

wherein the message output interface actively provides the message to the message using device comprises: when the message using device cannot obtain the message voluntarily, the message output interface is implemented as the master interface, and sends the message actively to the message using device;

wherein the message output interface passively provides the message to the message using device comprises: when the message using device can obtain the message voluntarily, the message output interface is implemented as the slave interface, and sends the message to the message using device in response to a message request from the message using device;

wherein the step of actively transmitting, by the message output interface, the read message to the message using device under the control of the controller comprises:

obtaining, by the controller, a status of the message using device via the message output interface, reading the message from the message memory based on the status, and transmitting the message to the message using device via the message output interface; or reading, by the controller, messages from the message memory periodically, and transmitting the messages to the message using device via the message output interface;

wherein the step of passively transmitting, by the message output interface, the read message to the message using device under the control of the controller comprises:

providing, by the controller, a message queue status to the message using device via the message output interface, obtaining a read request transmitted by the message using device based on the message queue status via the message output interface, reading the message from the message memory based on the read request, and transmitting the message to the message using device via the message output interface; or obtaining, by the controller, the read request transmitted periodically by the message using device via the message output interface, reading the message from the message memory based on the read request, and transmitting the message to the message using device via the message output interface.

5. The method according to claim 4, wherein the step of actively obtaining, by the message input interface, the message created by the message creating device under the control of the controller comprises:

obtaining, by the controller, a status of the message creating device via the message input interface, and extracting the message from a buffer of the message creating device based on the status; or extracting, by the controller, messages from the buffer of the message creating device via the message input interface periodically.

6. The method according to claim 4, wherein the step of passively obtaining, by the message input interface, the message created by the message creating device under the control of the controller comprises:

receiving, by the controller, the message transmitted actively by the message creating device via the message input interface.

* * * * *